United States Patent
Howell et al.

(10) Patent No.: US 8,347,208 B2
(45) Date of Patent: Jan. 1, 2013

(54) CONTENT RENDERING ON A COMPUTER

(75) Inventors: Gareth Alan Howell, Bothell, WA (US); Matthew James Ruhlen, Redmond, WA (US); Brendyn O'Dell-Alexander, Seattle, WA (US); Nicholas Allen Robarge, Redmond, WA (US); Zhenjun Zhu, Redmond, WA (US); Sugandha SudeshKumar Kapoor, Sammamish, WA (US); Kiran Akella Venkata, Bellevue, WA (US); Juraj Gottweis, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 425 days.

(21) Appl. No.: 12/397,351

(22) Filed: Mar. 4, 2009

(65) Prior Publication Data

US 2010/0229086 A1 Sep. 9, 2010

(51) Int. Cl.
*G06F 17/00* (2006.01)
(52) U.S. Cl. .................................... 715/234; 715/249
(58) Field of Classification Search .................. 715/234, 715/200, 273, 249
See application file for complete search history.

(56) References Cited

U.S. PATENT DOCUMENTS

| | | | | |
|---|---|---|---|---|
| 5,737,599 A | * | 4/1998 | Rowe et al. .......................... | 1/1 |
| 5,778,372 A | * | 7/1998 | Cordell et al. ....................... | 1/1 |
| 5,838,906 A | * | 11/1998 | Doyle et al. ................... | 715/205 |
| 6,401,131 B1 | * | 6/2002 | Haverstock et al. .......... | 709/246 |
| 6,565,609 B1 | * | 5/2003 | Sorge et al. .................... | 715/234 |
| 6,590,674 B1 | * | 7/2003 | Orton .......................... | 358/1.18 |
| 6,613,098 B1 | * | 9/2003 | Sorge et al. .................... | 715/234 |
| 6,704,024 B2 | * | 3/2004 | Robotham et al. ............ | 345/581 |
| 7,188,312 B2 | * | 3/2007 | Hsiu-Ping et al. ............ | 715/249 |
| 7,242,406 B2 | * | 7/2007 | Robotham et al. ............ | 345/581 |
| 7,346,843 B2 | | 3/2008 | Hind et al. | |
| 2002/0111973 A1 | * | 8/2002 | Maddalozzo et al. ........ | 707/526 |
| 2002/0198963 A1 | | 12/2002 | Wu et al. | |
| 2003/0106021 A1 | * | 6/2003 | Mangrola ..................... | 715/513 |
| 2005/0080804 A1 | | 4/2005 | Bradshaw, Jr. et al. | |
| 2005/0097458 A1 | | 5/2005 | Wilson | |
| 2005/0132284 A1 | * | 6/2005 | Lloyd et al. ................... | 715/517 |
| 2005/0216846 A1 | | 9/2005 | Kalenius | |
| 2005/0268215 A1 | * | 12/2005 | Battagin et al. ............... | 715/503 |
| 2006/0212798 A1 | | 9/2006 | Lection et al. | |
| 2006/0242572 A1 | * | 10/2006 | Grantham et al. ............ | 715/526 |
| 2008/0201452 A1 | * | 8/2008 | Athas et al. ................... | 709/219 |
| 2008/0263052 A1 | | 10/2008 | Parsell et al. | |
| 2009/0313574 A1 | * | 12/2009 | Shih et al. ..................... | 715/781 |

(Continued)

FOREIGN PATENT DOCUMENTS

KR 10-0576487 B1 5/2006

(Continued)

OTHER PUBLICATIONS

"International Search Report", Mailed Date: Sep. 29, 2010, Application No. PCT/US2010/025678, Filed Date: Feb. 26, 2010, pp. 9.

(Continued)

*Primary Examiner* — Manglesh M Patel
(74) *Attorney, Agent, or Firm* — Hope Baldauff Hartman, LLC (57) ABSTRACT

Portions of content are transformed into portions of rendered content. While the portions of the content are being transformed into portions of the rendered content, each discrete portion of the rendered content can be provided to the application program after that portion is completed.

17 Claims, 5 Drawing Sheets

U.S. PATENT DOCUMENTS

2011/0258535 A1* 10/2011 Adler et al. ............... 715/235

FOREIGN PATENT DOCUMENTS

| WO | 02-27710 A1 | 4/2002 |
|---|---|---|
| WO | 2007-032912 A1 | 3/2007 |

OTHER PUBLICATIONS

Patent Abstract KR 10-2006-0131913 in the name on Nokia Corp. published Dec. 20, 2006.

"Microsoft Security Advisory (937696)", retrieved at <<http://www.microsoft.com/technet/security/advisory/937696.mspx>>, May 21, 2007, pp. 1-2.

"Render Elements Panel and Rollout", retrieved at <<http://www.kxcad.net/autodesk/3ds_max/Autodesk_3ds_Max_9_Reference/render_elements_panel_and_rollout.html>>, Nov. 7, 2008, pp. 1-9.

Wilkinson Andy,"Working with SpringSource Application Platform's Provisioning Repository", retrieved at <<http://blog.springsource.com/2008/05/09/working-with-springsource-application-platforms-provisioning-repository/>>, May 9, 2008, pp. 1-5.

Packard Keith, "Design and Implementation of the X Rendering Extension", retrieved at <<http://keithp.com/~keithp/talks/usenix2001/xrender/>>, Nov. 7, 2008, pp. 1-16.

Cheng, X. "Understanding the Characteristics of Internet Short Video Sharing: YouTube as a Case Study", Jul. 25, 2007, pp. 1-9, [online][retrieved on Apr. 11, 2012] retrieved from: http://arxiv.org/pdf/0707.3670.pdf.

"Dallas Museum of Art Optimizes Enterprise-Wide, Web-Related Business Processes with Stellent Universal Content Management" Aug. 31, 2005, pp. 1-4, [online][retrieved on Apr. 11, 2012] retrieved from: http://findarticles.com/p/articles/mi_m0EIN/is_2005_August_31/ai_n14938657/.

Sirohi, C. "Document Conversion Services in IBM WebSphere Portal: Overview and Troubleshooting," Dec. 18, 2007, pp. 1-8, [online][retrieved on Apr. 11, 2012] retrieved from: www.ibm.com/developerworks/websphere/library/techarticles/0712_sirohi/0712_sirohi.html.

"MS Office-to-HTML Converters: Recommendations" May 18, 2005, pp. 1-4 [online] [retrieved on Apr. 11, 2012] retrieved from: http://www.highdots.com/forums/macromedia-dreamweaver/ms-office-html-converters-recommendations-140436.html.

Calore, M. "Soapbox Needs a Little Sparkle", Oct. 13, 2006, pp. 1 [online][retrieved on Apr. 11, 2012] retrieved from: www.wired.com/science/discoveries/news/2006/10/71941?currentPage=all.

Hartsock, N. "Stellent Gives Outside In Its Own Graphical Rendering Layer", Mar. 11, 2005, pp. 1-3 [online][retrieved on Apr. 11, 2012] retrieved from: www.publish.com/c/a/Web-Design/Stellent-Gives-Outside-In_Its-Own_Graphical-Rendering-Layer/.

Sutch, D. "A Hook into Stellent" Jul. 6, 2006, 2 pps. [online][retrieved on Apr. 11, 2012] retrieved from: http://blog.sutch.us/a-hook-into-stellent.

* cited by examiner

CONTENT RENDERING ON A COMPUTER

BACKGROUND

Productivity application programs, such as word processing applications, spreadsheet applications, and presentation applications, enable users to create different types of documents. These documents may include data that is native to a particular document type and even to a particular application program. In order to view this native data, a user may view the document through the productivity application program that created the document. For example, a user may rely on a particular word processing application to view a word processing document that was created by the word processing application.

A problem can arise when documents are shared across the World Wide Web (hereinafter referred to as "web") through web browsers. In particular, typical web browsers may not be capable of reading a given document in its native format. In order to address this problem, a web server can be implemented to execute code that is capable of rendering a document from its native format into a web-compatible format that can be viewed through the web browser.

Conventional implementations of such web servers render a document in its entirety prior to providing the rendered version to the web browser. This is sometimes referred to as document pre-rendering. During pre-rendering, a user who requests to view a given document may be forced to wait a significant amount of time before the document has been completely rendered. This delay can cause substantial frustration and inconvenience for the user.

It is with respect to these considerations and others that the disclosure made herein is presented.

SUMMARY

Technologies are described herein for rendering content, such as documents. An application server is provided for rendering documents and other content from a native document format into a web-compatible format capable of being viewed through a web browser or other suitable application. The application server includes a rendering module, which is operative to incrementally render documents. Through incremental rendering, the application server can provide portions of rendered documents to the web browser while the native documents are still being rendered. Other example implementations of the technologies described herein include converting a document from one format into another format (e.g., transforming a document from a binary file format into an Office Open XML format, a Portable Document Format ("PDF"), and the like).

A download manager is also provided in order to increase the throughput of the rendering module. While the rendering module is rendering one document, the download manager may begin retrieving other documents to be rendered at a later time. These other documents may be downloaded from a storage server and stored in a rendering queue on the application server. Once the rendering module becomes available, the rendering module can immediately begin rendering these other documents directly from the rendering queue without any downtime while waiting for documents to be retrieved.

One or more caches are also provided in order to reduce the amount of work utilized to retrieve documents and other content. Examples of caches include a document cache, an authorization cache, and a location cache. The document cache may be operative to store rendered documents in the front end, thereby eliminating the need to retrieve the rendered documents from other storage units in the back end. The authorization cache may be operative to store authorization and authentication data, thereby eliminating the need to re-authorize or re-authenticate a user who later accesses the same document. The location cache may be operative to store the location of a rendered document. Through the use of the location cache, the rendered document can be efficiently retrieved from the relevant storage unit without the need to query multiple storage units.

According to one embodiment, a method is provided herein for rendering content for viewing through a web browser operating on a computer. Portions of the content are transformed into portions of rendered content. While the portions of the content are being transformed into portions of the rendered content, at least one of the portions of the rendered content can be provided to an application program.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all of the disadvantages noted in any part of this disclosure.

DETAILED DESCRIPTION

The following detailed description is directed to technologies for rendering content, such as documents. Through the utilization of the technologies and concepts presented herein, an application server is provided that is operative to incrementally render a document or other content from its native format into another format, such as a web-compatible format. In contrast to pre-rendering, as content is being incrementally rendered, each discrete portion of the document or other content that has been rendered can be made available to the user. One or more caches may also be provided in order to reduce the amount of work utilized to retrieve rendered content.

Embodiments described herein may refer to pages and slides as discrete portions of documents and rendered documents. However, it should be appreciated that pages and slides are merely examples of discrete portions and are not intended to be limiting. Other kinds of discrete portions, as contemplated by those skilled in the art, may be similarly implemented.

Although not so limited, embodiments described herein primarily refer to documents and document rendering. However, it should be appreciated that the embodiments described herein may be similarly applied to any suitable content which can be rendered from a native format into another format. Such content may include any multimedia, such as text, images, audio, video, and combinations thereof. Further, embodiments described herein primarily refer to the rendered format as a web-compatible format capable of being viewed through a web browser. However, it should be appreciated that the rendered format may be other suitable formats as contemplated by those skilled in the art.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
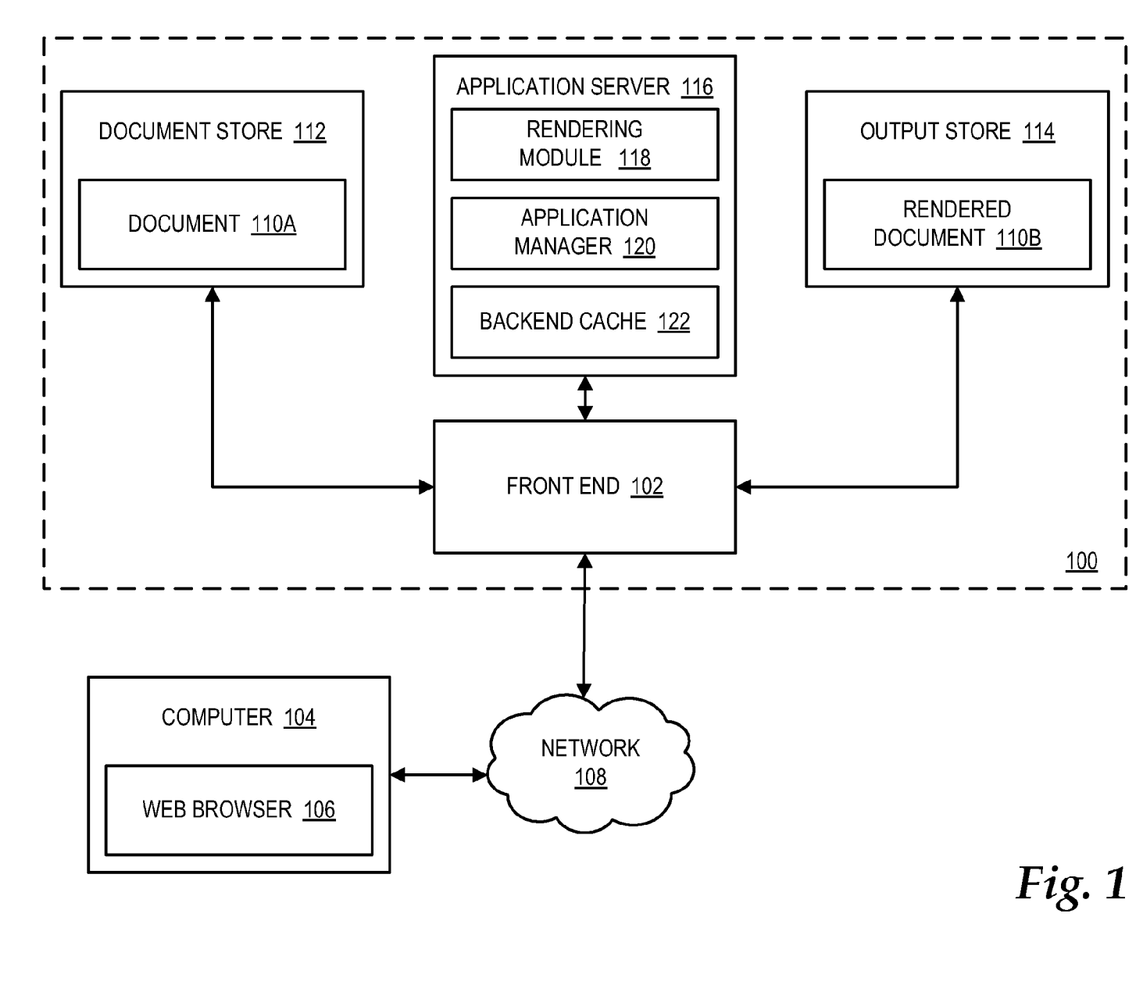
FIG. 1 is a block diagram showing an illustrative system architecture operative to render documents for viewing through a web browser, in accordance with embodiments.

In the following detailed description, references are made to the accompanying drawings that form a part hereof, and which are showing by way of illustration specific embodiments or examples. Referring now to the drawings, in which like numerals represent like elements through the several figures, concepts and technologies for providing on-demand content viewing will be described. In particular, FIG. 1 is a block diagram showing a system architecture 100 operative to render documents and to retrieve rendered documents according to embodiments. The architecture 100 includes a front end 102 that is operative to communicate with a computer 104. The front end 102 may receive and process requests from a web browser 106 over a network 108, such as the Internet. For example, the front end 102 may receive a Hypertext Transfer Protocol ("HTTP") message with a request for a specific document, such as document 110A, stored in a document store 112. It should be appreciated that the components of the architecture 100 may reside on the same server, according to further embodiments. Splitting the architecture 100 into the front ends and application servers is merely an implementation design choice and is not intended to be limiting.

In response to receiving the HTTP request, the web front end 102 may attempt to retrieve, from an output store 114, a web-compatible rendered document 110B corresponding to the requested document 110A. For example, the rendered document 110B may be stored in the output store 114 if the document 110A was recently rendered. If the output store 114 contains the rendered document 110B corresponding to the document 110A, then the output store 114 may return the rendered document 110B to the front end 102.

If the output store 114 does not contain the rendered document 110B, then the application server 116, and more specifically the rendering module 118, may retrieve the document 110A from the document store 112. According to embodiments, a rendering module 118 in the application server 116 is operative to render (i.e., convert, transform) the document 110A into the rendered document 110B. The rendering module 118 may generate the rendered document 110B in any format capable of being displayed by a suitable web browser. Example formats may include an image format (e.g., Portable Network Graphics ("PNG"), Joint Photographic Experts Group ("JPEG"), etc.), MICROSOFT SILVERLIGHT, ADOBE FLASH, and the like. The rendering module 118 may also generate the rendered document 110B into a web-ready rendition that may include Extensible Markup Language ("XML"), scripts, Hypertext Markup Language ("HTML"), images, and/or the like, such that individual data types in the web-ready rendition can be understood collectively by the web browser. Each of these data types may be made available to the user upon being generated by the incremental rendering process described herein. The rendering module 118 may also be operative to concurrently render multiple documents. Upon generating the rendered document 110B, the application server 116 may store the rendered document 110B in the output store 114 and return the rendered document 110B to the front end 102.

Upon receiving the rendered document 110B, the front end 102 may respond to the HTTP request by providing the rendered document 110B to the web browser 106 via the HTTP protocol. The web browser 106 can then display the rendered document 110B, which is a full-fidelity representation of the corresponding document 110A. The full-fidelity representation contains the same formatting (e.g., layout, resolution, content, etc.) found in the original representation. Thus, a user can expect the same experience viewing a given document whether the document is viewed through a productivity application program or through a web browser, such as the web browser 106. The full-fidelity representation can be contrasted against a lower-fidelity representation in which, for example, the layout may be changed or the resolution and content may be reduced. In other embodiments, the rendered document 110B may be utilized for non-viewing scenarios, such as converting binary files to another document type for editing. For example, a MICROSOFT OFFICE binary file may be rendered into an OPEN OFFICE EXTENSIBLE MARKUP LANGUAGE ("OOXML") file.

It should be appreciated that the components and the configuration of the components within the architecture 100 of FIG. 1 are merely illustrative and are not intended to be limiting. In other embodiments, the architecture 100 may include additional front ends and/or additional application servers. Further, multiple front ends and/or multiple application servers may reside on the same server. For example, additional front ends may be utilized to handle a greater quantity of requests from web browsers. In one embodiment, the additional application servers are deployed to handle the rendering of heavier loads. In another embodiment, additional application servers are deployed to render different types of documents. For example, one application server may be dedicated to rendering word processing documents, while another application server may be dedicated to rendering presentations. In yet another embodiment, additional application servers are deployed to render different elements of a given document. The rendered elements can then be combined to create the rendered document. For example, one application server may render video in a presentation, while another application server may render the text in the presentation. In this case, the front end 102 may be operative to combine the results of the two application servers to form the rendered presentation.

In some embodiments, in response to a single request to render a document in a given format, the front end 102 may direct the application server 116 to render the document into multiple formats in order to support multiple uses across multiple device types and web client configurations. For example, the web browser 106 may request from the front end 102 a given document rendered in ADOBE FLASH. The front end 102 may determine, through a user profile associated with the user operating the web browser 106, that the user frequently accesses documents in ADOBE FLASH, MICROSOFT SILVERLIGHT, Portable Network Graphics ("PNG"), mobile, and full versions. The front end 102 may also determine, through the user profile that the user frequently accesses documents in a web-ready rendition including a combination of XML, scripts, HTML, images, and/or the like. In this case, the front end 102 may fulfill the request by rendering the document in one or more of these versions. Other suitable data may be similarly utilized to determine whether the front end 102 directs the application server 116 to render a document into multiple formats in response to a single render request. By proactively rendering documents into multiple formats in response to a single request rather than rendering the document in response to specific requests for the additional formats, the architecture 100 can more expeditiously provide the rendered documents.

According to embodiments, the application server 116 further includes an application manager 120. The application manager 120 is operative to manage incremental rendering of the document 110A into the rendered document 110B. As used herein, "incremental rendering" refers to providing portions of the rendered document 110B as the document 110A is being rendered by the rendering module 118. For example, the rendered first page of a word processing document or a rendered first slide of a presentation may be provided to the front end 102, which can then provide the rendered first page or the rendered first slide to the web browser 106 for display. Other embodiments may render any particular page or slide in the document. Other embodiments may also render other portions of content besides pages or slides. As the remainder of the word processing document or presentation is being rendered by the rendering module 118, the application manager 120 may provide the additional rendered pages and rendered slides to the web browser 106.

In order to provide incremental rendering, the application manager 120 may make available portions of the rendered document 110B as the document 110A is being rendered by the rendering module 118. The front end 102 can then retrieve these portions of the rendered document 110B, as necessary, from the application server 116. In one embodiment, the portions of the rendered document 110B are stored in a back-end cache 122 in the application server 116.

During incremental rendering, the pages or slides of a document may be rendered in any predefined order. The rendered pages or slides are then made available to the front end 102 in the same order as they were rendered. In one embodiment, the documents are rendered from the beginning of the document to the end of the document.

In contrast to conventional pre-rendering where a user must wait until the entire document is rendered, incremental rendering reduces the amount of rendering time before a user can view a portion, such as the beginning or some other portion, of the document. For example, in conventional pre-rendering, a user desiring to view a first page of a word processing document or a first slide of a presentation would need to wait until the entire word processing document or presentation is rendered. In an illustrative implementation of incremental rendering, the user can more quickly view the first page or the first slide prior to the remainder of the word processing document or the presentation being rendered.

In some embodiments, the user may request a page N or a slide N of a document where the variable N represents any page or slide within the document. The request may occur prior to or while the document is being rendered. Upon receiving the request for the page N or slide N, the application manager 120 may direct the rendering module 118 to render the page N or the slide N by seeking the particular page or slide within the document. The rendered page N or slide N can then be made available to the front end 102. Upon making available the rendered page N or slide N, the application manager 120 may proceed with rendering the remainder of the document.

In some embodiments, the rendering module 118 is operative to incrementally render a document even when the document has yet to be fully downloaded. That is, the rendering module 118 may begin rendering the document while it is being downloaded from the document store 112, rather than wait until the entire file has been downloaded. This approach to rendering a document before it has fully downloaded may reduce the amount of time it takes for the rendering module 118 to render a document, especially if the document is relatively large.

Figure 2:
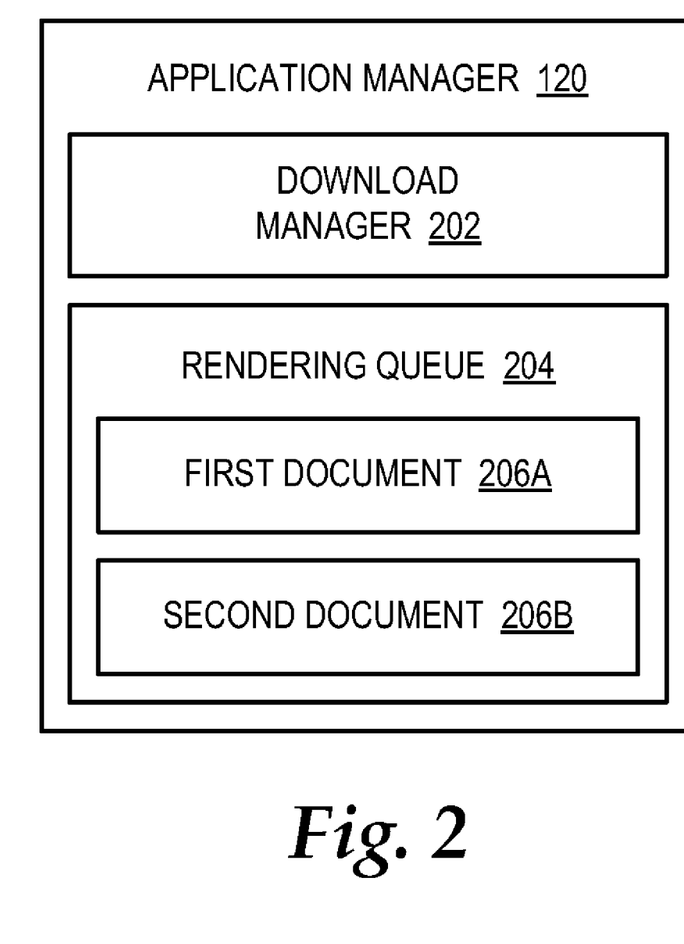
FIG. 2 is a block diagram showing an illustrative implementation of an application manager from the system architecture of FIG. 1, in accordance with embodiments.

Turning now to FIG. 2, additional details regarding the application manager 120 will be described. In particular, FIG. 2 is a block diagram showing the application manager 120 according to embodiments. The application manager 120 includes a download manager 202 and a rendering queue 204. According to embodiments, the download manager 202 is operative to download documents from the document store 112 prior to the rendering module 118 rendering the documents. The download manager 202 may then store the downloaded documents in the rendering queue 204 until the rendering module 118 is available to render the documents. It should be appreciated that the rendering queue 204 may operate without the download manager 202. However, the download manager 202 may be utilized to speed processing through the rendering queue 204. Further, even when the download manager 202 is present, the rendering queue 204 may operate independently of the download manager 202 to handle instances when the application manager 120 is overloaded.

In an illustrative example, if a request is made to render a first document 206A and a second document 206B, the download manager 202 may download the first document 206A from the document store 112, and the rendering module 118 may begin rendering the first document 206A. As the rendering module 118 renders the first document 206A, the download manager 202 may concurrently download the second document 206B from the document store 112 and store the second document 206B in the rendering queue 204. Upon rendering the first document 206A, the rendering module 118 can then immediately proceed to rendering the second document 206B from the rendering queue 204 without waiting for the second document 206B to be downloaded. In this way, throughput of the rendering module 118 is improved by eliminating any idle time found in conventional implementations where the rendering module 118 would wait for the second document 206B to download.

It should be appreciated that the rendering queue 204 may be configured to store any number of documents, as contemplated by those skilled in the art. In some embodiments, the download manager 202 may be configured by a user to adjust the number of documents being downloaded simultaneously and the maximum number of documents stored in the rendering queue 204 that are awaiting rendering. In this way, the user can ensure that the number of documents being downloaded and/or stored at any given time does not place an excessive burden on system resources.

Figure 3:
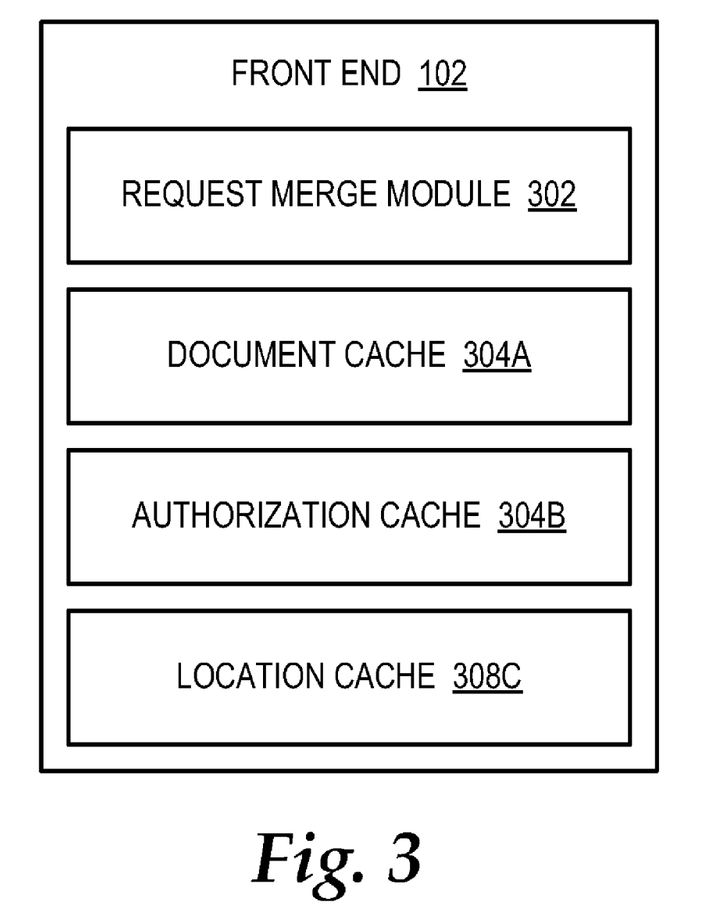
FIG. 3 is a block diagram showing an illustrative implementation of a front end from the system architecture of FIG. 1, in accordance with embodiments.

Turning now to FIG. 3, additional details regarding the front end 102 will be described. In particular, FIG. 3 is a block diagram showing the front end 102 according to embodiments. The front end 102 includes a request merge module 302 and several caches 304, including a document cache 304A, an authorization cache 304B, and a location cache 304C. According to embodiments, the request merge module 302 maintains tracking data identifying a particular application server that is currently rendering a given document. The request merge module 302 may utilize this tracking data to direct additional requests for the same document to the same application server. By directing additional requests for the same document to the same application server, redundant work between application servers is reduced, and other application servers are free to render other documents.

As previously described, the system architecture 100 of FIG. 1 may include multiple front ends and multiple application servers. These front ends may or may not be capable of communicating with each other. In the case where front ends do not communicate with each other, the request merge module 302 may be configured to perform consistent hashing in order to identify a particular application server for a particular document request. In consistent hashing, one or more aspects of a given document request may be analyzed in order to map these aspects to a particular application server. In this way, separate front ends can direct multiple requests for the same document to the same application server, even when the front ends cannot communicate with each other. An example of an aspect of a document request is the name of the document being requested. It should be appreciated that consistent hashing in this case can significantly increase the likelihood that documents are not rendered multiple times on different application servers (e.g., multiple front ends could receive requests for the same document). Without consistent hashing, many application servers may receive these requests and process the same document. Other hashing techniques capable of mapping document requests to application servers may be similarly utilized.

The caches 304 may improve performance of the front end 102 by reducing the need for the front end 102 to access other parts of the system architecture 100, such as the output store 114 and the application server 116. According to embodiments, the document cache 304A is operative to cache at least portions of rendered documents according to popularity. For example, documents that are frequently requested can be retrieved directly from the document cache 304A instead of accessing the output store 114 or the application server 116. Any of a variety of factors and methodologies may be utilized for determining the popularity of documents, as contemplated by those skilled in the art.

According to embodiments, the authorization cache 304B is operative to store authorization or authentication information associated with users. Access to the documents and the rendered documents may be restricted based on an authorization process whereby a user enters identification information, such as a username and password. For example, when a user attempts to access a particular document, the front end 102 may access an authorization module (not shown), which requests information, such as a login identifier and password, identifying the user. The authorization module may then determine whether the user has permission to access the document. The authorization module may be configured to permit access to the document only when the authorization module verifies that the user has permission.

When the authorization module successfully verifies the user, the authorization cache 304B may store state information indicating that the user has been verified. The front end 102 may utilize this state information to verify that the user has or does not have permission to access the document without the need for accessing the authorization module. In this way, the front end 102 is not required to send credentials to an remote authorization service, thereby optimizing performance of the front end 102. Further, the user does not have to re-enter identification information for additional requests to access the same document.

The state information stored in the authorization cache 304B may be particularly useful when a user requests only a portion of a given document at a time. For example, a user may initially request only a first page of a multi-page document. Upon submitting the request for the first page of the document, the user may be required to enter identification information (i.e., credentials) in order to view the first page. If the user subsequently requests additional pages of the document, the front end 102 can expeditiously authorize the user based on the credentials stored in the authorization cache 304B. Thus, each authentication of the user does not necessarily result in the user being prompted for credentials. Further, the need to re-query other servers to authenticate and authorize the user can be eliminated. The authorization cache 304B may be configured to store the state information for any amount of time after which the state information may be deleted.

According to embodiments, the location cache 304C, which may also be referred to as a "dictionary", is operative to store the location of a given rendered document. For example, the location cache 304C may indicate the particular storage unit that stores a particular rendered document. Examples of storage units may include the output store 114 and the back-end cache 122. The storage units may be part of the system architecture 100 or separate from the system architecture 100. By storing the location of rendered documents in the location cache 304C, the front end 102 can direct requests for a rendered document to the specific storage unit, as opposed to individually querying each storage unit and causing additional loads on the storage units.

Figure 4A:
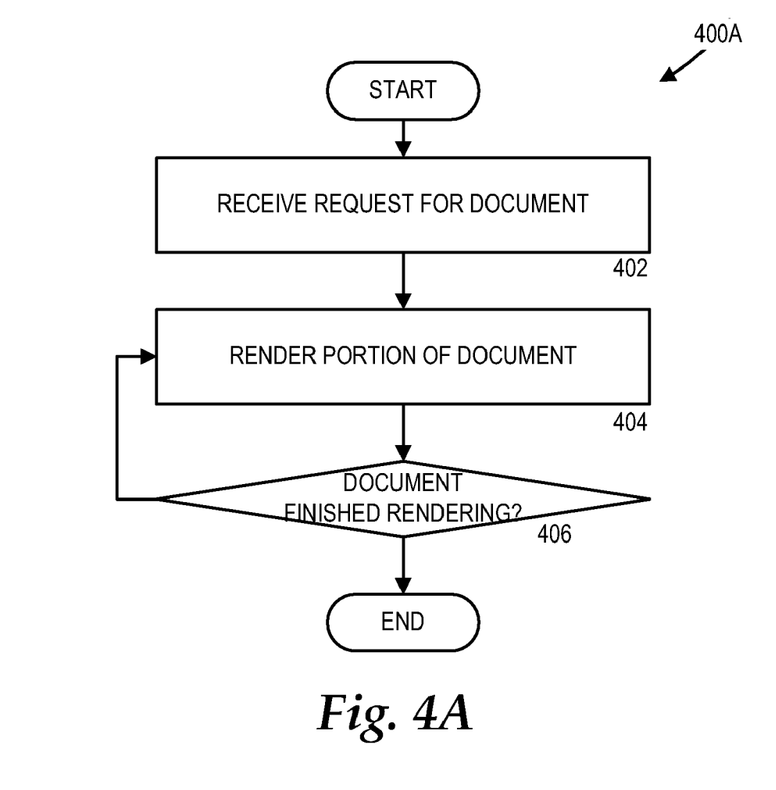
FIG. 4A is a flow diagram showing an illustrative process for rendering content for viewing through a web browser, in accordance with embodiments.
Figure 4B:
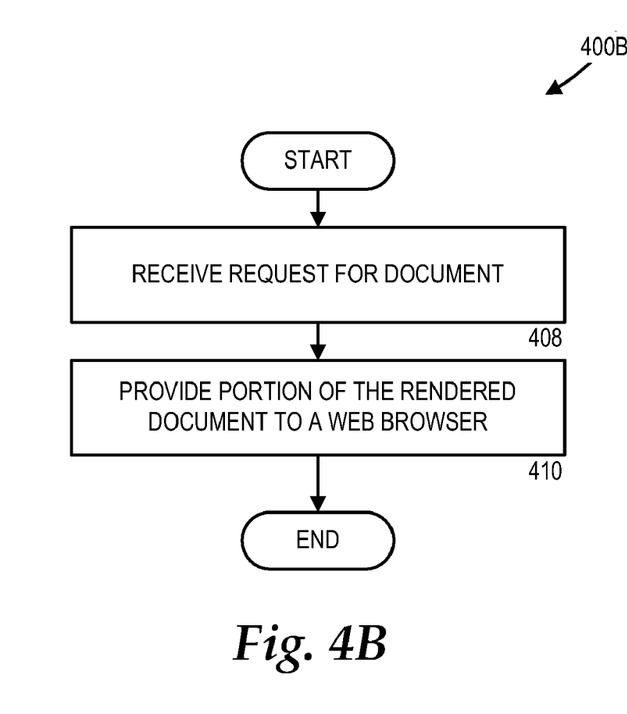
FIG. 4B is a flow diagram showing an illustrative process for fetching a portion of the rendered content, in accordance with embodiments.

Referring now to FIGS. 4A and 4B, additional details will be provided regarding the embodiments presented herein for rendering documents for viewing through a web browser. In particular, FIG. 4A is a flow diagram illustrating one method for rendering content for viewing through a web browser operating on a computer. FIG. 4B is a flow diagram illustrating one method for fetching a rendered portion of the content. The method of FIG. 4B may be performed concurrently or after the method of FIG. 4A is performed. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 4A, a routine 400 begins at operation 402, where the front end 102 receives a request from the web browser 106 for a document, such as the document 110A. The routine 400 then proceeds to operation 404, where the front end 102 directs the rendering module 118 to begin incrementally rendering the document 110A. In particular, the rendering module 118 may retrieve the document 110A from the document store 112. Upon retrieving the document 110A from the document store 112, the rendering module 118 may render the first page or the first slide of the document 110A. In some embodiments, the request may specify a particular slide or page of the document 110A. In this case, the rendering module 118 may render the particular page or the particular slide instead of the first page or the first slide. Upon generating the first page or the first slide of the rendered document 110B, the routine proceeds to operation 406.

At operation 406, the rendering module 118 determines whether the document 110A has been completely rendered. If the document 110A has been completely rendered, then the routine 400A terminates. If the document 110A has not been completely rendered, the routine 400 proceeds back to operation 404 where the next page or next slide of the document 110A is rendered. Operation 404 may be repeated as many times as necessary until the document 110A has been completely rendered into the rendered document 110B.

In FIG. 4B, a routine 400B begins at operation 408, where the front end 102 receives a request from the web browser 106 for a document, such as the document 110A. The routine 400B then proceeds to operation 410, where as pages or slides of the rendered document 110B are rendered by the rendering module 118, the application manager 120 may make available these pages or slides of the rendered document 110B to the front end 102. If a particular page or particular slide is requested, the application manager 120 may also make available that particular page or particular slide. The rendering module 118 may make available the pages or slides of the rendered document 110B through the backend cache 122. The front end 102 may then retrieve the pages or slides of the rendered document 110B from the backend cache 122 and transmit the pages or slides of the rendered document 110B to the web browser 106 for display.

It should be appreciated that the routine 400B may be performed while the document 110A is being incrementally rendered according to the routine 400A. That is, while the rendering module 118 is rendering pages or slides of the document 110A according to routine 400A, the application manager 120 may fulfill requests for those rendered pages or slides according to routine 400B. In this way, the front end 102 can continue to retrieve the additional pages or slides of the rendered document 110B without waiting for the entire rendered document 110B to be generated. Further, while the application manager 120 is fulfilling requests for pages or slides of the rendered document 110B, the rendering module 118 may continue to render additional pages or slides from the document 110A.

According to some embodiments, additional requests for other documents may be received by the front end 102. Instead of waiting until the rendering module 118 has completed rendering the document 110A into the rendered document 110B, the download manager 202 may retrieve the other documents from the document store 112 and store the documents in the rendering queue 204 while the rendering module 118 is still rendering the document 110A. Upon rendering the document 110A into the rendered document 110B, the rendering module 118 can begin rendering these other documents without waiting for them to be retrieved from document store 112.

According to some embodiments, additional requests for the document 110A may be directed to the same application server 116. In this way, other application servers can be available to render other documents. Further, according to some embodiments, the rendering module 118 may render the document 110A into multiple formats in response to a single request.

Figure 5:
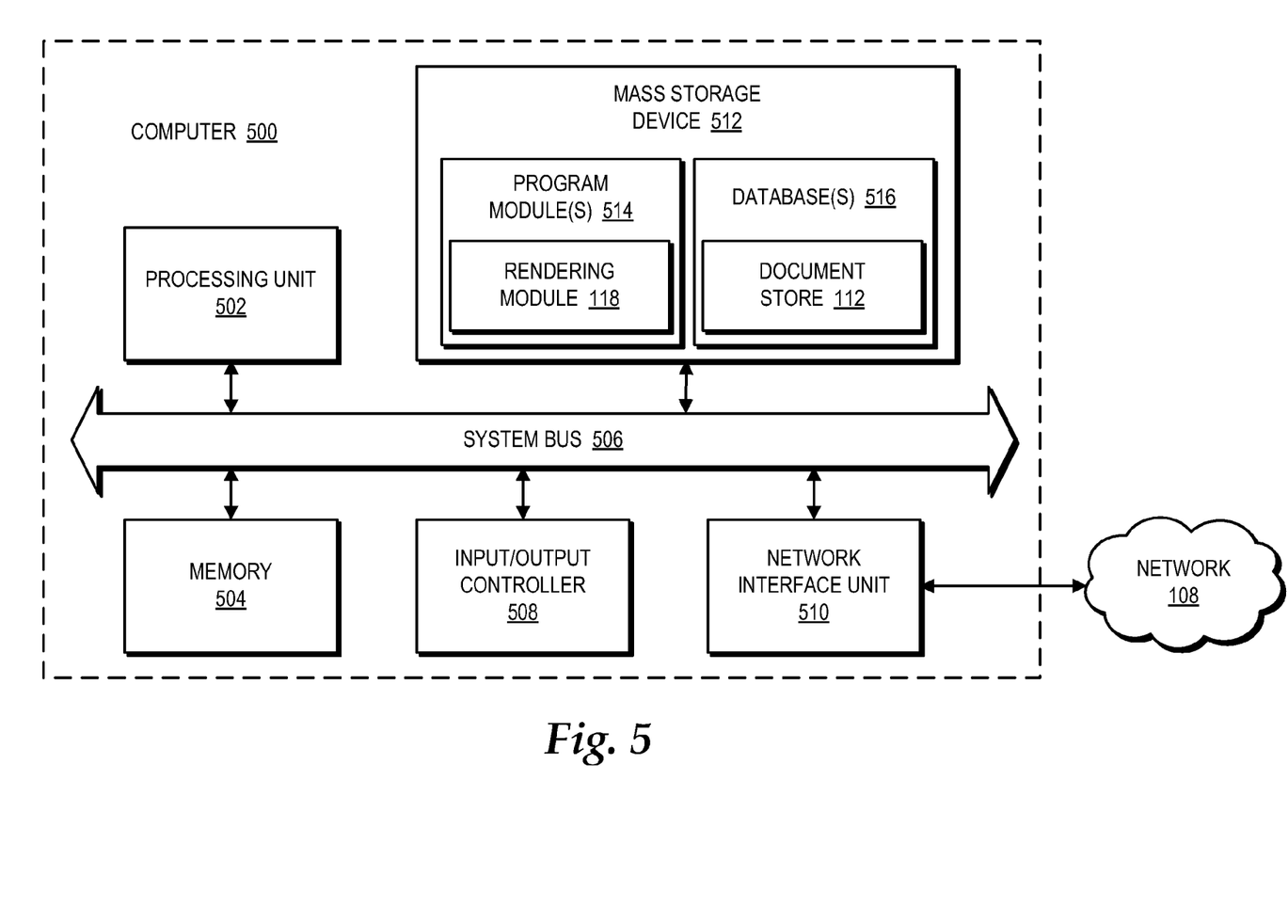
FIG. 5 is a computer architecture diagram showing an illustrative computer hardware architecture for a computing system capable of implementing the embodiments presented herein.

Referring now to FIG. 5, an exemplary computer architecture diagram showing a computer 500 is illustrated. The computer 500 includes a processing unit 502 ("CPU"), a system memory 504, and a system bus 506 that couples the memory 504 to the CPU 502. The computer 500 further includes a mass storage device 512 for storing one or more program modules 514, such as the rendering module 118, and one or more databases 516, such as the document store 112. Other program modules 514 may include the web browser 106, the download manager 202, and the request merge module 302. Other databases 516 may include the output store 114, the rendering queue 204, and the caches 304. The mass storage device 512 is connected to the CPU 502 through a mass storage controller (not shown) connected to the bus 506. The mass storage device 512 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network, such as the network 108. The computer 500 may connect to the network 108 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. Similarly, the input/output controller 508 may provide output to a display or other type of output device (not shown).

Based on the foregoing, it should be appreciated that technologies for rendering content, such as documents, for viewing through a web browser are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for rendering content on a computer, the method comprising computer-implemented operations for:
receiving, from an application program, a request to view the content;
upon receiving the request to view the content, transforming portions of the content embodied in a first file format into portions of rendered content embodied in a second file format; and
while transforming the portions of the content into portions of the rendered content, providing at least one of the portions of the rendered content to an application program, the application program configured to display the rendered content in the second file format and incapable of displaying the content in the first file format, wherein the application program comprises a web browser, wherein the rendered content is adapted to provide a full-fidelity representation of the content through the web browser without invoking a separate viewer to the web browser to view the rendered content within the web browser, and wherein providing at least one of the portions of the rendered content to the application program comprises providing at least one of the portions of the rendered content to the web browser.

2. The computer-implemented method of claim 1, wherein the content comprises a document; and wherein transforming portions of the content into portions of the rendered content comprises transforming a page of the document into a page of a rendered document.

3. The computer-implemented method of claim 1, wherein the content comprises a presentation; and wherein transforming portions of the content into portions of the rendered content comprises transforming a slide of the presentation into a slide of a rendered document.

4. The computer-implemented method of claim 1, the method further comprising computer-implemented operations for storing the rendered content in a document cache.

5. The computer-implemented method of claim 1, the method further comprising computer-implemented operations for:
determining whether a user operating the web browser has permission to view the content; and
wherein transforming portions of the content into portions of the rendered content comprises in response to determining that the user operating the web browser has permission to view the content, transforming portions the content into portions of the rendered content.

6. The computer-implemented method of claim 5, the method further comprising computer-implemented operations for:
in response to determining that the user operating the web browser has permission to view the content, storing state information in an authorization cache, the state information indicating that the user has or does not have the permission.

7. The computer-implemented method of claim 1, the method further comprising computer-implemented operations for:
receiving, from the web browser, a request for a specified portion of the content; and
wherein transforming portions of the content into portions of the rendered content comprises transforming the specified portion of the content into a specified portion of the rendered content.

8. The computer-implemented method of claim 7, wherein receiving, from the web browser, a request for the content comprises receiving, from the web browser, requests for the content and a second content; and the method further comprising computer-implemented operations for:
while transforming portions of the content into portions of the rendered content, retrieving the second content from a content store and storing the second content in a rendering queue.

9. The computer-implemented method of claim 1, the method further comprising computer-implemented operations for:
prior to transforming portions of the content into portions of the rendered content, retrieving the content from a document store; and
wherein transforming portions of the content into portions of rendered content comprises while retrieving the content from the document store, transforming the portions the content into portions of the rendered content.

10. The computer-implemented method of claim 1, wherein transforming portions of the content into portions of the rendered content comprises:
transforming, through a first rendering module, a first element in one portion of the content into a first element of the rendered content, and
transforming, through a second rendering module, a second element in the one portion of the content into a second element of the rendered content, and
combining the first element of the rendered content and the second element of the rendered content to form the one portion of the rendered content.

11. The computer-implemented method of claim 1, the method further comprising computer-implemented operations for:
storing the rendered content in one of a plurality of storage units; and
storing a location of the rendered content in a location cache, the location corresponding to one of the plurality of storage units.

12. A rendering computer system comprising:
a document store operative to store a document embodied in a first file format;
an application server having at least a processor and a memory and being operative to (i) receive, from a web browser over a network, a request to view the document, (ii) retrieve the document from the document store upon receiving the request to view the document from the web browser, (iii) transform portions of the document embodied in the first file format into portions of a rendered document embodied in a second file format, the rendered document adapted to provide a full-fidelity representation of the document through the web browser without invoking a separate viewer to the web browser to view the rendered document within the web browser, and (iv) while transforming the portions of the document embodied in the first file format into the portions of a rendered document embodied in a second file format, provide one or more of the portions of the rendered document to the web browser over the network, the web browser configured to display the rendered document in the second file format and incapable of displaying the document in the first file format;
an output store operative to store the rendered document from the application server; and
a front end operative to facilitate communications between the web browser and the application server.

13. The rendering computer system of claim 12, wherein the application server comprises:
a rendering module operative to (i) receive, from the web browser over the network, a request for the document and (ii) in response to receiving the request for the document, transform portions of the document into portions of the rendered document;
an application manager operative to manage retrieval of documents from the document store for rendering by the rendering module, the application manager further operative to (i) receive, from the web browser over the network, the request for the document and (ii) in response to receiving the request for the document, provide, over the network, a portion of the rendered document to the web browser for display through the web browser; and
a backend cache for storing the rendered document.

14. The rendering computer system of claim 13, wherein the application manager comprises:
a download manager operative to retrieve additional documents from the document store; and
a rendering queue operative to store the additional documents retrieved by the download manager, the rendering queue operative to provide the additional documents to the rendering module for rendering.

15. The rendering computer system of claim 12, wherein the front end comprises:
a document cache operative to store the rendered document;
an authorization cache operative to store authorization information indicating whether a user is operative the web browser has permission to access the document; and
a location cache operative to store the location of the rendered document in one or a plurality of storage units.

16. The rendering computer system of claim 15, wherein the front end further comprises a request merge module operative to maintain tracking data identifying the application server that is rendering the document, the front end being further operative to direct additional requests for the same document to the same application server.

17. A computer-readable medium having computer-executable instructions stored thereon which, when executed by a computer, cause the computer to:
receive, from a web browser over a network, requests for a first document and a second document, the first document and the second document embodied in a first file format;
in response to receiving the requests, retrieve the first document from a document store;
upon retrieving the first document from the document store, transform a page of the first document into a page of a rendered document embodied in a second file format, the rendered document adapted to provide a full-fidelity representation of the document through the web browser without invoking a separate viewer to view the rendered document within the web browser;
while transforming the page of the first document into the page of the rendered document, retrieve the second document from the document store;
transform additional pages of the document into additional pages of the rendered document to generate the rendered document;
while transforming additional pages of the document into additional pages of the rendered document, receive a request for the page of the rendered document from the web browser; and
in response to the request for the page of the rendered document, provide the page of the rendered document to the web browser for display through the web browser, the web browser configured to display the rendered document in the second file format and incapable of displaying the document in the first file format.

* * * * *